United States Patent
Balakrishnan et al.

(10) Patent No.: US 12,314,256 B2
(45) Date of Patent: *May 27, 2025

(54) MANAGEMENT OF OBJECT DEPENDENCY RECORDS IN A CLOUD SYSTEM

(71) Applicant: Snowflake Inc., Bozeman, MT (US)

(72) Inventors: Raja Suresh Krishna Balakrishnan, Fremont, CA (US); Khalid Zaman Bijon, Santa Cruz, CA (US); Subramanian Muralidhar, Mercer Island, WA (US); David Schultz, Piedmont, CA (US); Jian Xu, San Jose, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/428,371

(22) Filed: Jan. 31, 2024

(65) Prior Publication Data

US 2024/0168946 A1 May 23, 2024

Related U.S. Application Data

(63) Continuation of application No. 18/181,423, filed on Mar. 9, 2023, now Pat. No. 11,928,108, which is a
(Continued)

(51) Int. Cl.
*G06F 16/242* (2019.01)
*G06F 16/21* (2019.01)
(Continued)

(52) U.S. Cl.
CPC ........ *G06F 16/2445* (2019.01); *G06F 16/211* (2019.01); *G06F 16/2291* (2019.01);
(Continued)

(58) Field of Classification Search
CPC .............. G06F 16/2445; G06F 16/211; G06F 16/2291; G06F 16/2358; G06F 16/2365; G06F 16/2453

See application file for complete search history.

(56) References Cited

U.S. PATENT DOCUMENTS 9,323,644 B1 * 4/2016 Hale ..................... G06F 8/22
9,535,932 B1 * 1/2017 DeSantis ............... G06F 16/21
(Continued)

FOREIGN PATENT DOCUMENTS

EP    1887480       2/2008
WO    2023009953    2/2023

OTHER PUBLICATIONS

U.S. Appl. No. 17/387,632 U.S. Pat. No. 11,347,730, filed Jul. 28, 2021, Object Dependency Tracking In A Cloud Database System.
(Continued)

*Primary Examiner* — Cam Y T Truong
(74) *Attorney, Agent, or Firm* — Schwegman Lundberg & Woessner, P.A.

(57) ABSTRACT

Aspects of the present disclosure address systems, methods, and devices for tracking object dependencies in a cloud database system. An object dependency created between a referencing object and a referenced object is detected. Based on detecting the object dependency, a dependency record is generated. The dependency record includes dependency information describing the object dependency between the reference object and the referenced object. The dependency record is stored in a database of dependency records.

20 Claims, 11 Drawing Sheets

Related U.S. Application Data continuation of application No. 17/659,797, filed on Apr. 19, 2022, now Pat. No. 11,645,275, which is a continuation of application No. 17/387,632, filed on Jul. 28, 2021, now Pat. No. 11,347,730.

(51) Int. Cl.
  *G06F 16/22* (2019.01)
  *G06F 16/23* (2019.01)
  *G06F 16/2453* (2019.01)

(52) U.S. Cl.
  CPC ...... *G06F 16/2358* (2019.01); *G06F 16/2365* (2019.01); *G06F 16/2453* (2019.01)

(56) References Cited

U.S. PATENT DOCUMENTS

| | | | |
|---|---|---|---|
| 11,347,730 B1 | 5/2022 | Balakrishnan et al. | |
| 11,645,275 B2 | 5/2023 | Balakrishnan et al. | |
| 11,928,108 B2 | 3/2024 | Balakrishnan et al. | |
| 2005/0015377 A1 | 1/2005 | Wan | |
| 2014/0365531 A1* | 12/2014 | Soundararajan | G06F 16/28 707/798 |
| 2015/0026117 A1 | 1/2015 | Wan | |
| 2015/0370726 A1* | 12/2015 | Hashimoto | G06F 12/1416 711/163 |
| 2016/0043999 A1* | 2/2016 | Wongkar | H04L 67/5682 726/12 |
| 2016/0357377 A1 | 12/2016 | Thimbleby | |
| 2017/0046376 A1 | 2/2017 | Yang et al. | |
| 2018/0300924 A1 | 10/2018 | Ligenza et al. | |
| 2019/0007263 A1* | 1/2019 | Lahiri | G06F 11/2257 |
| 2019/0018880 A1* | 1/2019 | Bendel | G06F 16/25 |
| 2020/0394177 A1* | 12/2020 | Maurer | G06F 9/45508 |
| 2020/0394218 A1 | 12/2020 | Jarett | |
| 2021/0232756 A1* | 7/2021 | Veselov | G06F 9/5016 |
| 2023/0032281 A1 | 2/2023 | Balakrishnan et al. | |
| 2023/0214383 A1 | 7/2023 | Balakrishnan et al. | |

OTHER PUBLICATIONS

U.S. Appl. No. 17/659,797 U.S. Pat. No. 11,645,275, filed Apr. 19, 2022, Tracking Object Dependency Information In A Cloud System.

U.S. Appl. No. 18/181,423 U.S. Pat. No. 11,928,108, filed Mar. 9, 2023, Object Dependency Status Tracking In A Cloud System.

"U.S. Appl. No. 17/387,632, Non Final Office Action mailed Nov. 17, 2021", 20 pgs.

"U.S. Appl. No. 17/387,632, Response filed Feb. 16, 2022 to Non Final Office Action mailed Nov. 17, 2021", 15 pgs.

"U.S. Appl. No. 17/387,632, Notice of Allowance mailed Mar. 11, 2022", 20 pgs.

"U.S. Appl. No. 17/659,797, Non Final Office Action mailed Jun. 2, 2022", 35 pgs.

"U.S. Appl. No. 17/659,797, Response filed Aug. 31, 2022 to Non Final Office Action mailed Jun. 2, 2022", 12 pgs.

"U.S. Appl. No. 17/659,797, Notice of Allowance mailed Sep. 21, 2022", 12 pgs.

"U.S. Appl. No. 17/659,797, Examiner Interview Summary mailed Sep. 28, 2022", 2 pgs.

"International Application Serial No. PCT US2022 073922, International Search Report mailed Oct. 6, 2022", 2 pgs.

"International Application Serial No. PCT US2022 073922, Written Opinion mailed Oct. 6, 2022", 5 pgs.

"U.S. Appl. No. 17/659,797, Notice of Allowance mailed Jan. 17, 2023", 12 pgs.

"U.S. Appl. No. 18/181,423, Non Final Office Action mailed Sep. 21, 2023", 48 pgs.

"U.S. Appl. No. 18/181,423, Response filed Nov. 30, 2023 to Non Final Office Action mailed Sep. 21, 2023", 11 pgs.

"U.S. Appl. No. 18/181,423, Notice of Allowance mailed Jan. 22, 2024", 17 pgs.

"International Application Serial No. PCT US2022 073922, International Preliminary Report on Patentability mailed Feb. 8, 2024", 7 pgs.

"European Application Serial No. 22850436.1, Extended European Search Report mailed Oct. 25, 2024", 9 pgs.

\* cited by examiner

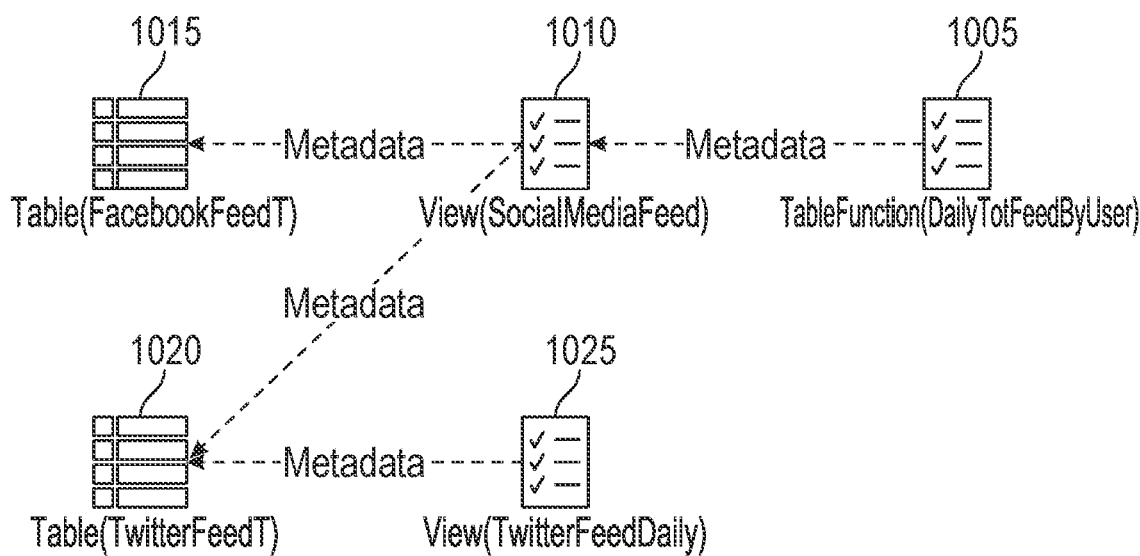

| REFERENCED_OBJECT_NAME | REFERENCED_OBJECT_DOMAIN | REFERENCING_OBJECT_NAME | REFERENCING_OBJECT_DOMAIN |
|---|---|---|---|
| TwitterFeedT | TABLE | SocialMediaFeed | VIEW |
| FacebookFeedT | TABLE | SocialMediaFeed | VIEW |
| SocialMediaFeed | VIEW | DailyTotFeedByUser | TABLE_FUNCTION |
| TwitterFeedT | TABLE | TwitterFeedDaily | VIEW |

Output

| name_path | domain_path | object_name | domain |
|---|---|---|---|
| PatientHealthRecord-> PatientDashboard | TABLE->VIEW | PatientDashboard | VIEW |
| PatientBillingRecord-> PatientDashboard | TABLE->VIEW | PatientDashboard | VIEW |
| PatientPersonalInfo-> PatientDashboard | TABLE->VIEW | PatientDashboard | VIEW |

*FIG. 10*

MANAGEMENT OF OBJECT DEPENDENCY RECORDS IN A CLOUD SYSTEM

CROSS-REFERENCE TO RELATED APPLICATIONS

This application is a Continuation of U.S. patent application Ser. No. 18/181,423, filed Mar. 9, 2023, which is a Continuation of U.S. patent application Ser. No. 17/659,797, filed Apr. 19, 2022 and issued on May 9, 2023 as U.S. Pat. No. 11,645,275, which is a Continuation of U.S. patent application Ser. No. 17/387,632, filed Jul. 28, 2021 and issued on May 31, 2022 as U.S. Pat. No. 11,347,730; the contents of which are incorporated herein by reference in their entireties.

TECHNICAL FIELD

Embodiments of the disclosure relate generally to databases and, more specifically, to object dependency tracking in a cloud database system.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables.

Some database objects (also referred to herein as "data objects" or simply as "objects") have dependencies on other database objects. Object dependencies can be created and destroyed by data defining language (DDL) operations on a referencing object. For example, if a view V refers to a table T using its definition, we say the V is depending on the table T. In this case, the view V is referred to as a "referencing object" and table T is referred to as a "referenced object."

BRIEF DESCRIPTION OF THE DRAWINGS

The present disclosure will be understood more fully from the detailed description given below and from the accompanying drawings of various embodiments of the disclosure.

FIG. 10 is a conceptual diagram illustrating aspects of the database system in tracking object dependencies and responding to queries for dependency information, in accordance with some embodiments of the present disclosure.

DETAILED DESCRIPTION

Figure 1:
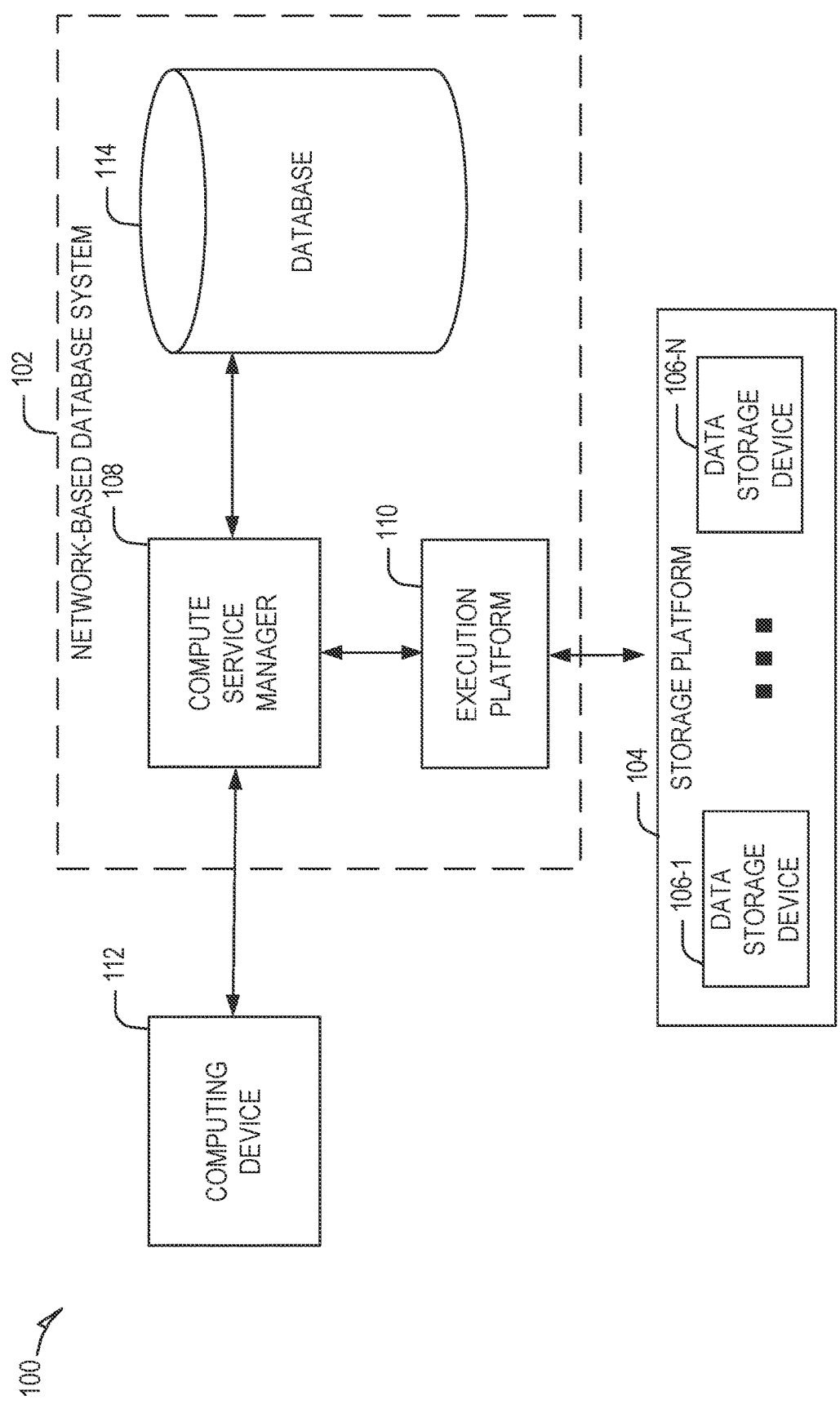
FIG. 1 illustrates an example computing environment that includes a cloud database system, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

It is often important to be able to track and understand object dependencies in a database system. For example, data engineers and data architects frequently want to identify the views and associated users that will be impacted by changes to tables so that they can proactively communicate the impact to users. For instance, if the data engineer is considering changing the data type of a table, he/she wants to be able to identify all views that refer to the impacted table. The data engineer wants to notify the data owner and data consumers of the impacted objects for further discussion. As another example, data privacy officers are responsible to ensure that data erasure requests from clients are satisfied according to jurisdictional privacy regulations. In doing so, data privacy officers have to identify all the tables from which the client information needs to be erased in case a data erasure request is received. For instance, the data privacy officer may want to identify all the tables referenced by a View that contains client data to demonstrate to auditors that data has been erased from all sources. As yet another example, data consumers such as data analysts, data scientists, and other users may want to ensure that the data in a view is coming from trustworthy tables.

Aspects of the present disclosure address systems, methods, and devices for tracking object dependencies in a cloud database system. A dependency management system within the cloud database system detects an object dependency created between objects based on a DDL operation performed on a referencing object. The dependency management system can detect the created object dependency at query time based on a command included in a query or based on an analysis of a log of DDL operations performed within the database system. In response to detecting the object dependency, the dependency management system generates a dependency record that includes dependency information that describes the object dependency between the referencing object and a referenced object. The dependency management system stores the dependency record in a database of dependency records.

The object dependency between the referencing object and the referenced object can change over time. Accordingly, the dependency management system continues to monitor DDL operations performed on the referencing and referenced objects and updates dependency records as needed. The manner in which the dependency management system updates records depends on the type of the object dependency and the change to the object dependency. For example, based on detecting a DDL operation that changes the object dependency, the dependency management system can perform any one or more of invalidating an existing records, creating one or more new records, and revalidating an existing invalid record.

In addition to tracking object dependencies, the dependency records generated by the dependency management system can also be used to provide dependency information for a given object. For example, a query that includes a request for dependency information for an object can be received by the database system. In response to the query, the database system accesses the database of dependency records to identify one or more records associated with the object. Depending on the nature of the query, the dependency records identified may include records that identify the object as a referencing object, a referenced object, or a combination of both such records. The database system extracts the dependency information from the identified records and provides the dependency information responsive to the query.

FIG. 1 illustrates an example computing environment 100 that includes a database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the computing environment 100 comprises the database system 102 and a storage platform 104 (e.g., AWS®, Microsoft Azure Blob Storage®, or Google Cloud Storage®). The database system 102 is used for reporting and analysis of integrated data from one or more disparate sources including storage devices 106-1 to 106-N within the storage platform 104. The storage platform 104 comprises a plurality of computing machines and provides on-demand computer system resources such as data storage and computing power to the database system 102.

The database system 102 comprises a compute service manager 108, an execution platform 110, and a database 114. The database system 102 hosts and provides data reporting and analysis services to multiple client accounts. Administrative users can create and manage identities (e.g., users, roles, and groups) and use permissions to allow or deny access to the identities to resources and services.

The compute service manager 108 coordinates and manages operations of the database system 102. The compute service manager 108 also performs query optimization and compilation as well as managing clusters of computing services that provide compute resources (also referred to as "virtual warehouses"). The compute service manager 108 can support any number of client accounts, such as end users providing data storage and retrieval requests, system administrators managing the systems and methods described herein, and other components/devices that interact with compute service manager 108.

The compute service manager 108 is also in communication with a computing device 112. The computing device 112 corresponds to a user of one of the multiple client accounts supported by the database system 102. In some embodiments, the compute service manager 108 does not receive any direct communications from the computing device 112 and only receives communications concerning jobs from a queue within the database system 102.

The compute service manager 108 is also coupled to database 114, which is associated with the data stored in the computing environment 100. The database 114 stores data pertaining to various functions and aspects associated with the database system 102 and its users. In some embodiments, the database 114 includes a summary of data stored in remote data storage systems as well as data available from a local cache. Additionally, the database 114 may include information regarding how data is organized in remote data storage systems (e.g., the storage platform 104) and the local caches. The database 114 allows systems and services to determine whether a piece of data needs to be accessed without loading or accessing the actual data from a storage device.

As will be discussed in further detail below, the compute service manager 108 includes a dependency management system to track object dependencies within the computing environment 100. The dependency management system monitors DDL operations that are performed within the context of the database system 102 to detect creation of object dependencies, and the dependency management system creates a dependency record for each detected dependency. The dependency management system also monitors DDL operations to detect changes to object dependencies and updates dependency records as needed. Dependency information included in dependency records can also be surfaced to users of the database system 102 responsive to queries for such information.

The compute service manager 108 is further coupled to the execution platform 110, which provides multiple computing resources that execute various data storage and data retrieval tasks. The execution platform 110 is coupled to storage platform 104. The storage platform 104 comprises multiple data storage devices 106-1 to 106-N. In some embodiments, the data storage devices 106-1 to 106-N are cloud-based storage devices located in one or more geographic locations. For example, the data storage devices 106-1 to 106-N may be part of a public cloud infrastructure or a private cloud infrastructure. The data storage devices 106-1 to 106-N may be hard disk drives (HDDs), solid state drives (SSDs), storage clusters, Amazon S3™ storage systems, or any other data storage technology. Additionally, the storage platform 104 may include distributed file systems (e.g., Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete database partition files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

As shown in FIG. 1, the data storage devices 106-1 to 106-N are decoupled from the computing resources associated with the execution platform 110. This architecture supports dynamic changes to the database system 102 based on the changing data storage/retrieval needs as well as the changing needs of the users and systems. The support of dynamic changes allows the database system 102 to scale quickly in response to changing demands on the systems and components within the database system 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 108, database 114, execution platform 110, and storage platform 104 are shown in FIG. 1 as individual discrete components. However, each of the compute service manager 108, database 114, execution platform 110, and storage platform 104 may be implemented as a distributed system (e.g., distributed across multiple systems/platforms at multiple geographic locations). Additionally, each of the compute service manager 108, database 114, execution platform 110, and storage platform 104 can be scaled up or down (independently of one another) depending on changes to the requests received and the changing needs of the database system 102. Thus, in the described embodiments, the database system 102 is dynamic and supports regular changes to meet the current data processing needs.

During typical operation, the database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in the database 114 assists the compute service manager 108 in determining which nodes in the execution platform 110 have already cached at least a portion of the data needed to process the task. One or more nodes in the execution platform 110 process the task using data cached by the nodes and, in some instances, data retrieved from the storage platform 104. It is desirable to retrieve as much data as possible from caches within the execution platform 110 because the retrieval speed is typically much faster than retrieving data from the storage platform 104.

As shown in FIG. 1, the computing environment 100 separates the execution platform 110 from the storage platform 104. In this arrangement, the processing resources and cache resources in the execution platform 110 operate independently of the data storage devices 106-1 to 106-N in the storage platform 104. Thus, the computing resources and cache resources are not restricted to specific data storage devices 106-1 to 106-N. Instead, all computing resources and all cache resources may retrieve data from, and store data to, any of the data storage resources in the storage platform 104.

Figure 2:
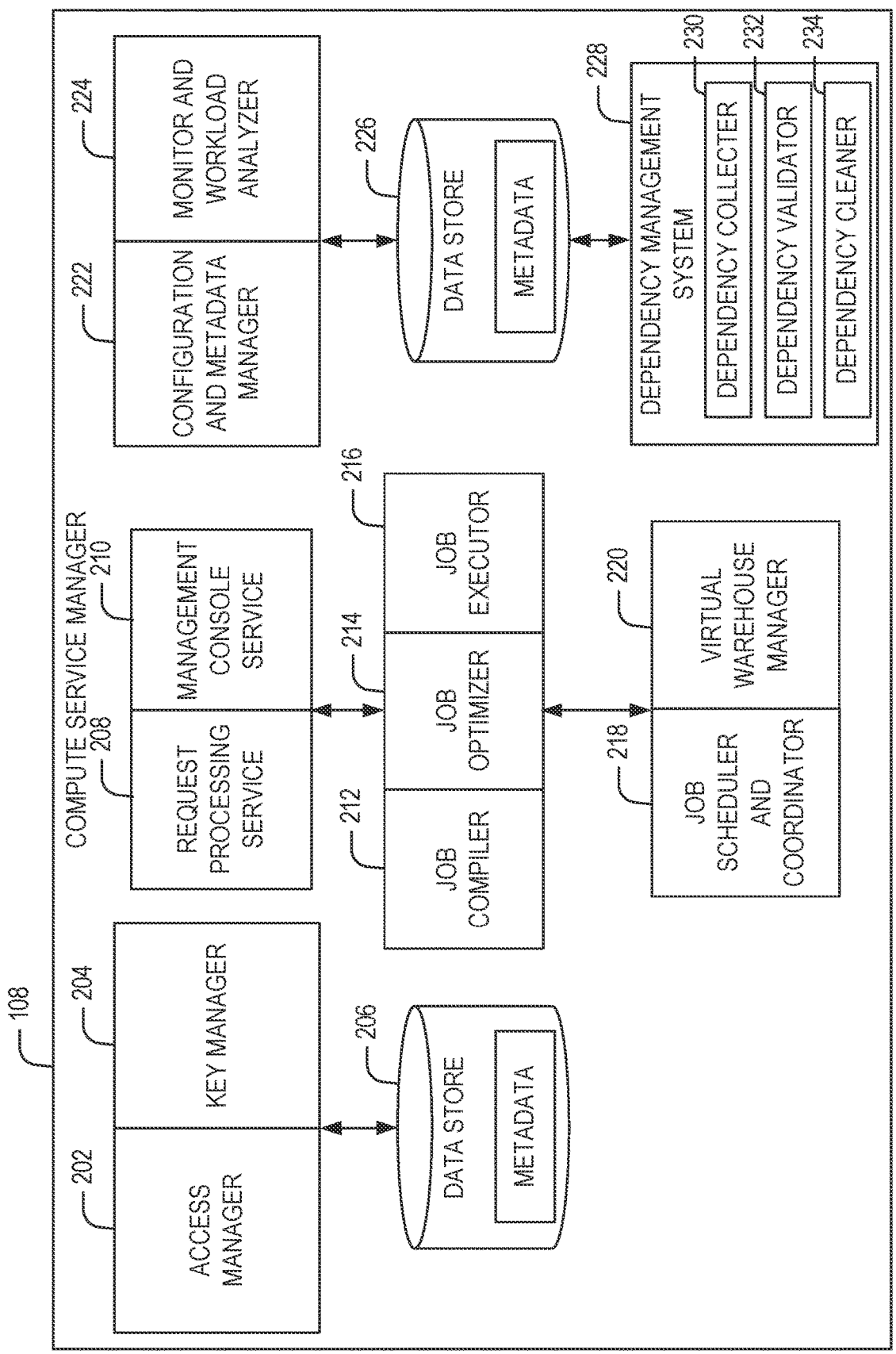
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in storage platform 104). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data needed to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110.

In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 108 includes a configuration and metadata manager 222, which manages the information related to the data stored in the remote data storage devices and in the local caches (e.g., the caches in execution platform 110). The configuration and metadata manager 222 can use the metadata to determine which partitions need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the database system 102 and may further redistribute tasks based on a user (e.g., "external") query workload. The execution platform 110 may also redistribute tasks based on a user (e.g., "external") query workload. The configuration and metadata manager 222 and the monitor and workload analyzer 224 are coupled to a data store 226. Data store 226 in FIG. 2 represents any data store within the database system 102. For example, data store 226 may correspond to caches in execution platform 110, storage devices in storage platform 104, or any other storage device.

A dependency management system 228 of the compute service manager 108 is responsible for managing object dependencies within the database system 102. The dependency management system 228 includes a dependency collector 230, a dependency validator 232, and a dependency cleaner 234. The dependency collector 230 monitors DDL operations performed within the database system 102 to detect creation of object dependencies. The dependency collector 230 generates a dependency record for each detected object dependency. Each dependency record includes dependency information that describes the object dependency. A dependency record can, for example, include any one or more of: an identifier of the referenced object (e.g., an object name or other unique identifier), a parent database of the referenced object, a parent schema of the referenced object, a domain of the referenced object, an identifier of the referencing object (e.g., an object name or other unique identifier), a parent database of the referencing object, a parent schema of the referencing object, and a domain of the referencing object. Dependency records are maintained in one or more metadata repositories of the database system 102, which can be included in the data store 226.

In addition, each dependency record can include an indication of a validity status for the corresponding object dependency. The status of an object' dependency can be valid or broken (invalid). Accordingly, a dependency record includes an indicator of the dependency being valid or broken. The dependency validator 232 is responsible for assessing the validity of object dependencies and maintaining an accurate status in corresponding dependency records. That is, the dependency validator 232 can change the status of a dependency record based on detecting a change to the status of the underlying dependency.

The dependency cleaner 234 is responsible for ensuring that the dependency information maintained in dependency records is up to date. In some instances, the dependency cleaner 234 can remove a dependency record from the database of dependency if the dependency record is no longer relevant to ongoing operations. Further details regarding the components of the dependency management system 228 are discussed below.

Figure 3:
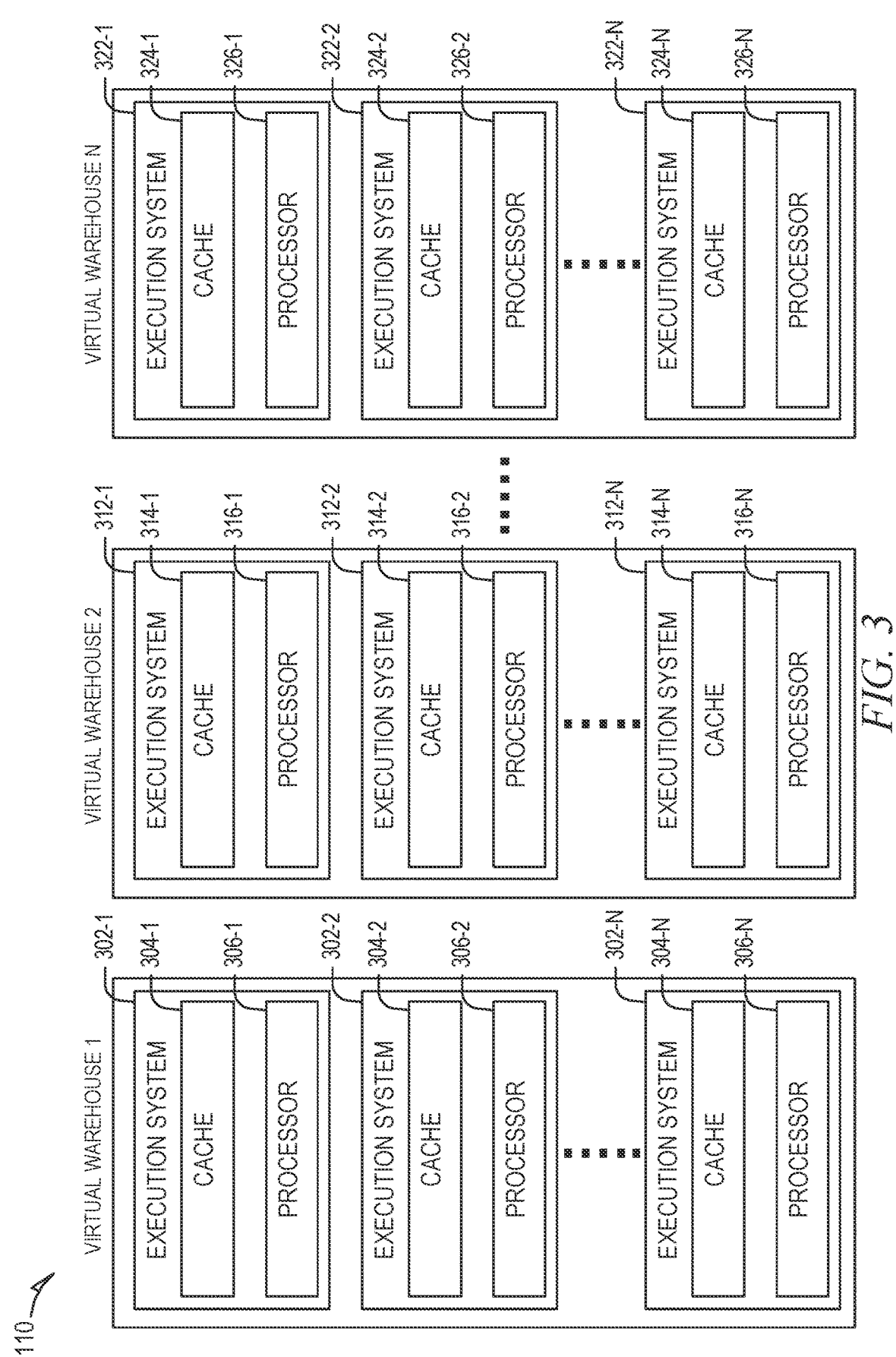
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present and existing execution nodes are deleted when they are no longer necessary.

Each virtual warehouse is capable of accessing any of the data storage devices 106-1 to 106-N shown in FIG. 1. Thus, the virtual warehouses are not necessarily assigned to a specific data storage device 106-1 to 106-N and, instead, can access data from any of the data storage devices 106-1 to 106-N within the storage platform 104. Similarly, each of the execution nodes shown in FIG. 3 can access data from any of the data storage devices 106-1 to 106-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data that the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
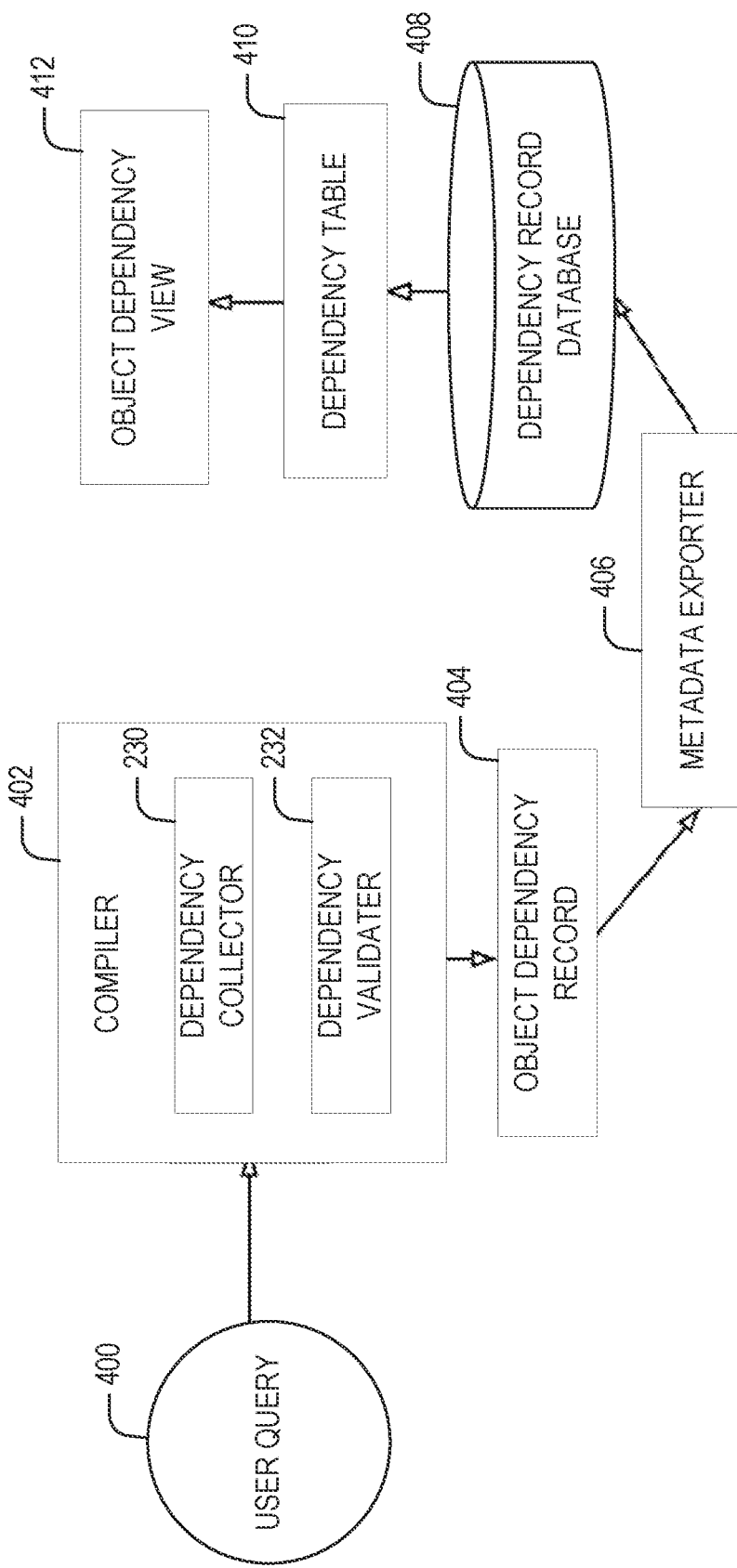
FIG. 4 is a flow diagram illustrating aspects of a dependency management system in tracking object dependencies in the cloud database system, in accordance with some embodiments of the present disclosure.

FIG. 4 is a flow diagram illustrating aspects of the dependency management system 228 in tracking object dependencies in the database system 102, in accordance with some embodiments of the present disclosure. As shown, a user query 400 is received by a compiler 402 of the compute service manager 108. The query 400 includes a command to create a first object (hereinafter referred to as a "referencing object") with a dependency on a second object (hereinafter referred to as a "referenced object").

There are multiple types of object dependencies within the context of the database system 102. For example, there are direct dependencies, by-Name object dependencies, and by-identifier object dependencies. With a direct dependency, a first object depends directly on a second object. With a by-Name object dependency, a first object refers to a second object by name. A by-Name dependency can depend on a database, schema, object name, or combinations thereof depending on whether the specified name is fully qualified ("x.y.z"), partially qualified ("y.z"), or unqualified ("z"). Examples of by-Name object dependencies include view and user defined function definitions that refer to a source table. As a more specific example of by-Name object dependency, a view V can be created by the following statement:

CREATE VIEW V AS SELECT*FROM Sch.T;

These types of dependencies are specified by the partial/full qualified name of the referenced object in the referencing object's definition where the definition is a SQL expression. Objects such as views, policies, functions, and procedures are examples that fall into this category.

With a by-ID dependency, a referencing object stores an identifier of a referenced object as a dependency. Generally, this dependency is stored as a specific field in metadata of the referencing object that stores the ID of the referenced object. As an example, an external table with a by-ID dependency on a stage includes an identifier of the stage in a specific field of the metadata for the table.

As shown in FIG. 4, the dependency collector 230 works in conjunction with the compiler 402 and detects the object dependency created based on the command. The dependency validator 232 analyzes the object dependency to determine a state of the dependency. More specifically, the dependency validator 232 determines whether the dependency is valid or invalid (also referred to herein as "broken"), which are two possible states for an object dependency. The dependency collector 230 creates a dependency record 404 based on the detected object dependency and the state of the dependency.

A metadata exporter 406 of the compute service manager 108 exports the dependency record 404 to a dependency record database 408. The dependency record database 408 can store multiple dependency records for multiple objects maintained by the database system 102. A dependency table 410 can be created from a set of dependency records within the dependency record database 408. An object dependency view 412 can be created from the table 410 to present dependency information for one or more objects. In an example, the object dependency view 412 corresponds to a specific object and provides dependency information for the object that specifies dependencies of the objects, dependencies on the object, or a combination of both.

Figure 5:
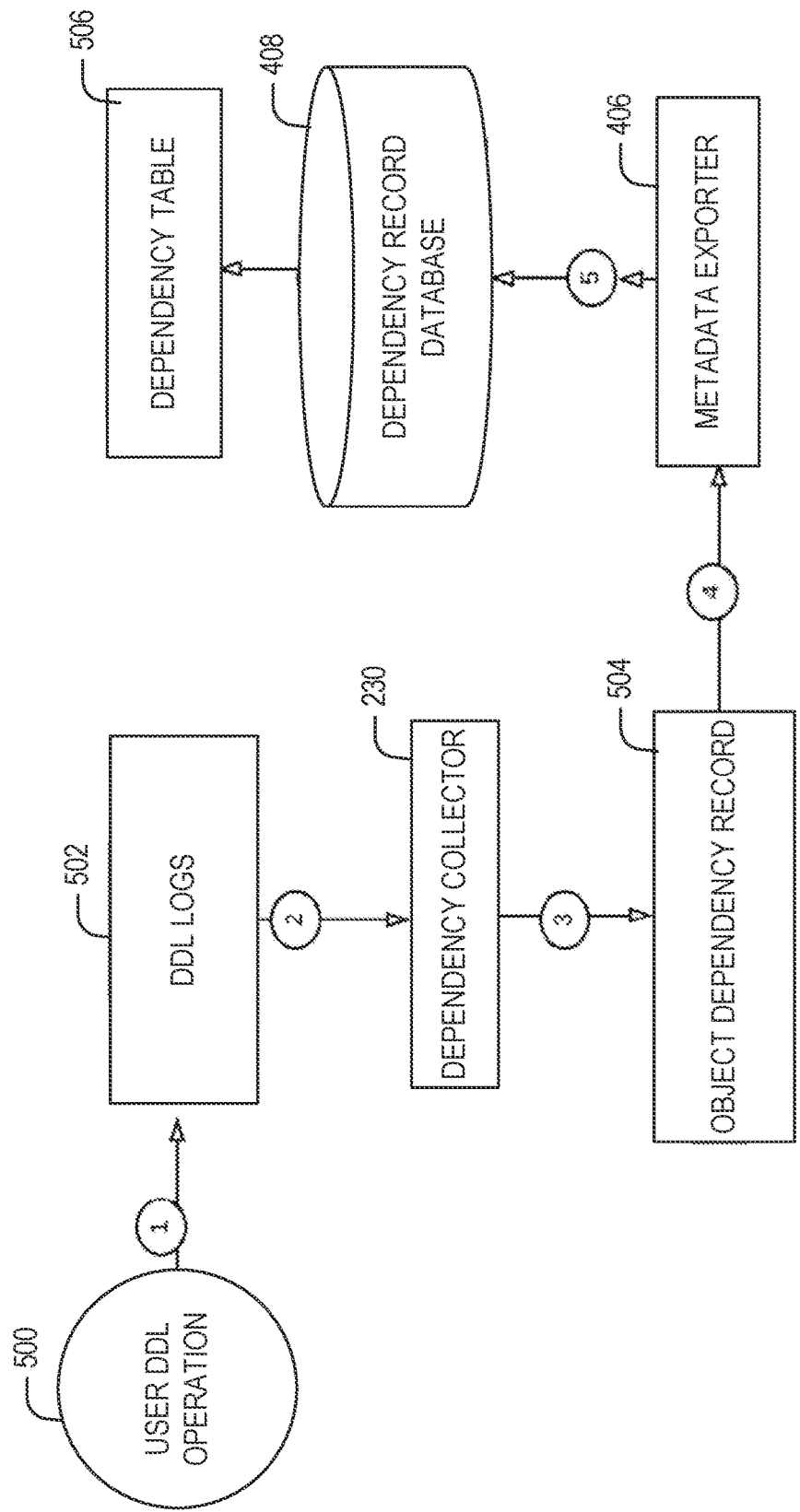
FIG. 5 is a flow diagram illustrating further aspects of the dependency management system in tracking object dependencies in the cloud database system, in accordance with some embodiments of the present disclosure.

FIG. 5 is a flow diagram illustrating aspects of the dependency management system 228 in tracking object dependencies in the database system 102, in accordance with some embodiments of the present disclosure. As shown, a user performed DDL operation 500 (e.g., create, drop, or update) is logged and included in DDL logs 502. The DDL operation results in the creation of an object dependency. The dependency collector 230 analyzes the DDL logs 502 and identifies the object dependency created based on the DDL operation 500. Based on the detected object dependency, the dependency collector 230 generates a dependency record 504 and stores the dependency record 504 in an intermediate database used to store records before exporting them to the dependency record database 408. The metadata exporter 406 periodically accesses the dependency records from the intermediate database and exports the records to the dependency record database 408. A table 506 can be created from a set of dependency records within the dependency record database 408.

Figure 6:
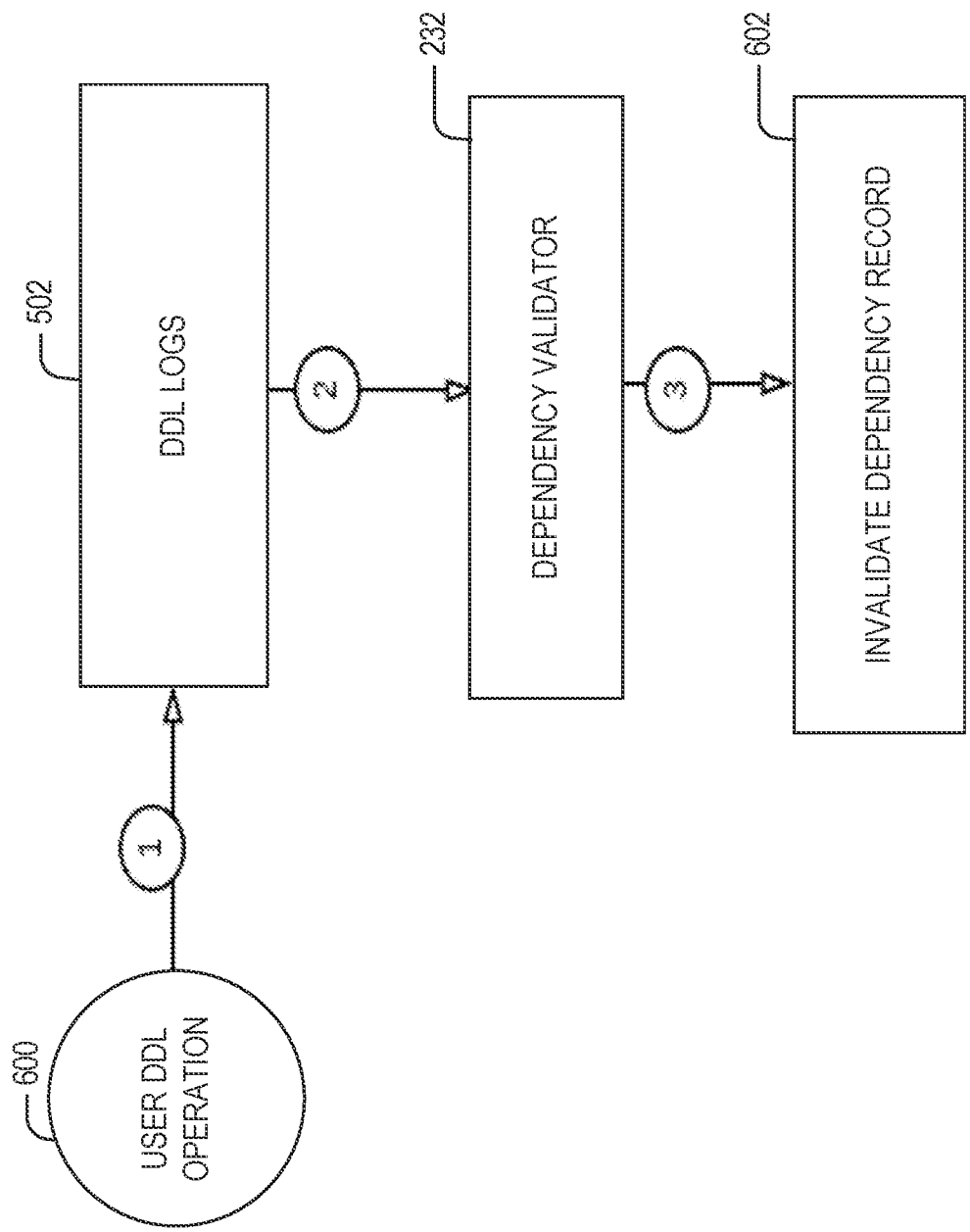
FIG. 6 is a flow diagram illustrating additional aspects of a dependency management system in tracking object dependencies in the cloud database system, in accordance with some embodiments of the present disclosure.

FIG. 6 is a flow diagram illustrating aspects of the dependency management system 228 in tracking object dependencies in the database system 102, in accordance with some embodiments of the present disclosure. As shown, a user performs a DDL operation 600 (e.g., create, drop, or update) on a first object with an existing dependency on a second object. The DDL operation 600 results in a change to either the first or second object. The DDL operation 600 is logged and added to the DDL logs 502. The dependency validator 232 accesses the DDL log 502 and detects the change to the first or second object resulting from the DDL operation 600. The dependency validator 232 analyzes whether the change results in the object dependency between the first and second object being broken (invalid). Based on determining that the change results in the object dependency being invalid, the dependency validator 232 invalidates the corresponding dependency record, at 602. In doing so, the dependency validator 232 changes the state of the dependency indicated in the dependency record from "valid" to "broken."

Figure 7:
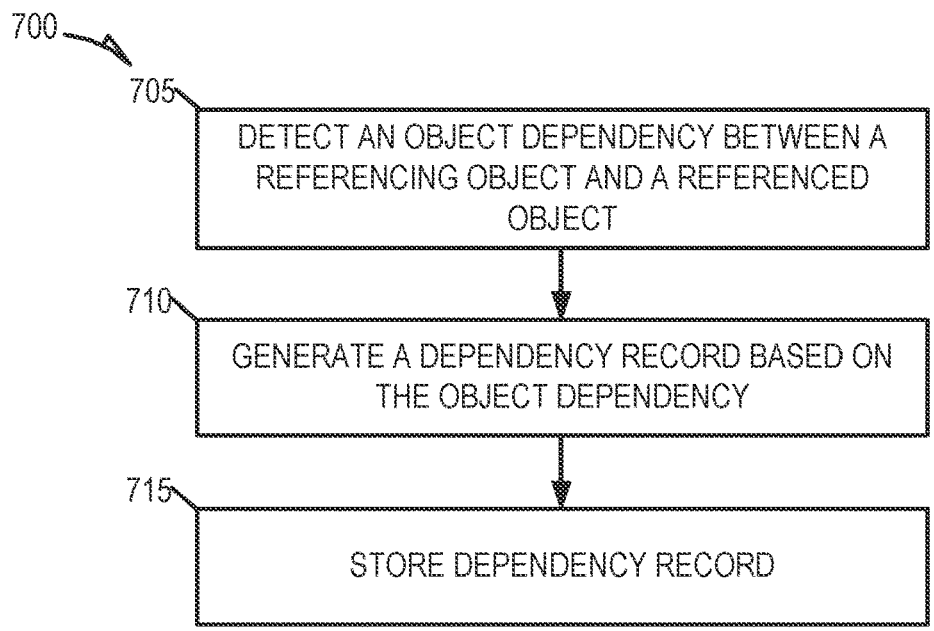
FIGS. 7 and 8 are flow diagrams illustrating operations of the dependency management system in performing a method for tracking object dependencies, in accordance with some embodiments of the present disclosure.
Figure 8:
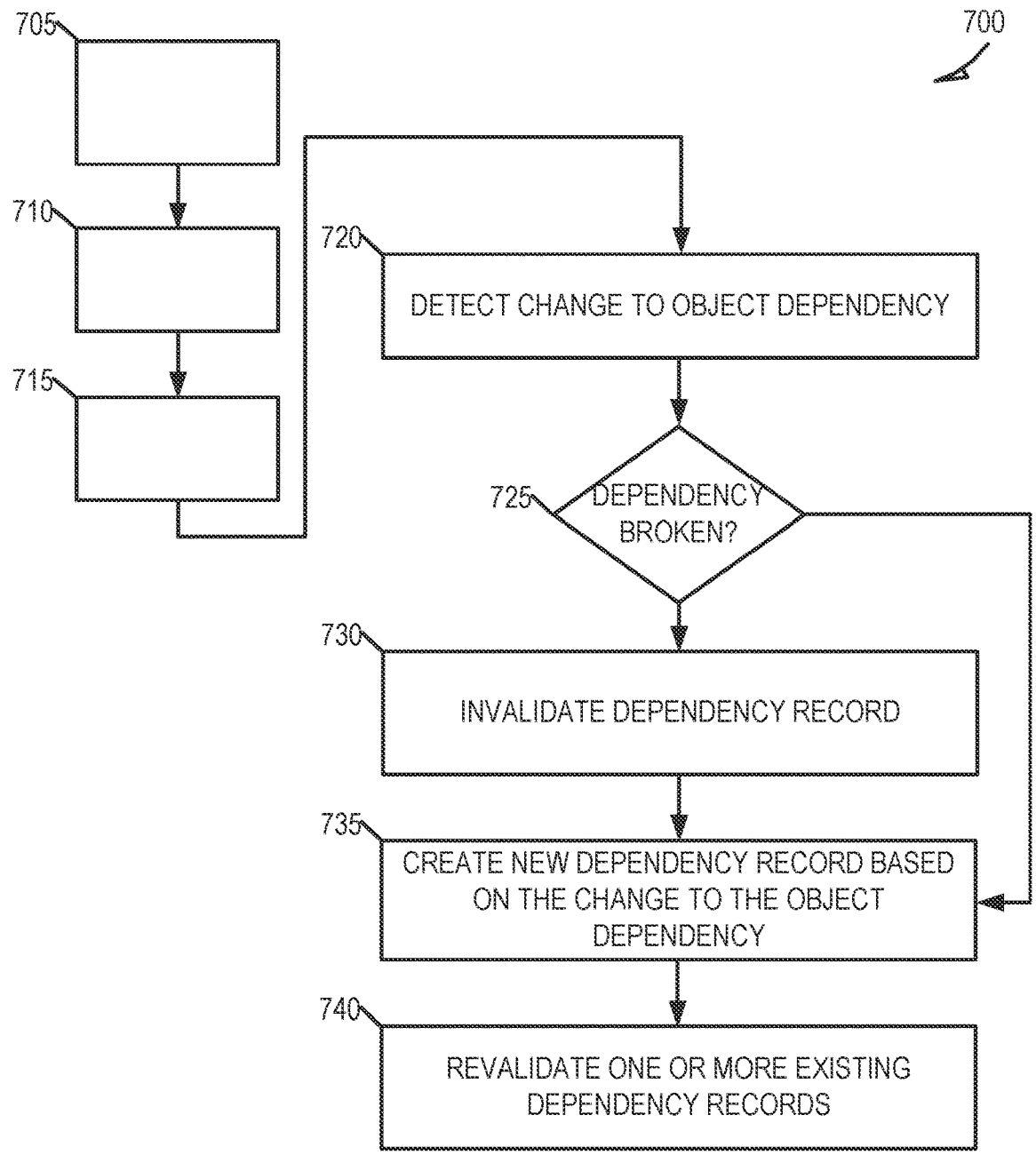

FIGS. 7-8 are flow diagrams illustrating operations of the database system 102 in performing a method 700 for tracking object dependencies, in accordance with some embodiments of the present disclosure. The method 700 may be embodied in computer-readable instructions for execution by one or more hardware components (e.g., one or more processors) such that the operations of the method 700 may be performed by components of database system 102. Accordingly, the method 700 is described below, by way of example with reference thereto. However, it shall be appreciated that the method 700 may be deployed on various other hardware configurations and is not intended to be limited to deployment within the database system 102.

Depending on the embodiment, an operation of the method 700 may be repeated in different ways or involve intervening operations not shown. Though the operations of the method 700 may be depicted and described in a certain order, the order in which the operations are performed may vary among embodiments, including performing certain operations in parallel or performing sets of operations in separate processes.

At operation 705, the dependency management system 228 detects an object dependency created between a referencing object and a referenced object. The dependency management system 228 detects the object dependency based on a command (e.g., a DDL) to create, manipulate, or modify objects stored by the database system 102. For example, the dependency management system 228 can detect the object dependency based on a DDL command to create the referencing object with a dependency on the referencing object. As a more specific example, the database system 102 can detect a DDL command that creates a view V on a table T. In this example, the view V is the referencing object with a dependency on the table T, which is the referenced object. The dependency management system 228 can detect the object dependency at query time based on an incoming command or based on a log of operations executed in response to received commands that is maintained in a database of the database system 102. Accordingly, in some embodiments, the detecting of the object dependency includes accessing a log of operations that includes an entry corresponding to an operation that created the object dependency.

At operation 710, the dependency management system 228 generates a dependency record based on the object dependency. The dependency record includes object dependency information that describes the object dependency between the referenced object and the referencing object. The dependency record can, for example, include any one or more of: an identifier of the referenced object (e.g., an object name or other unique identifier), a parent database of the referenced object, a parent schema of the referenced object, a domain of the referenced object, an identifier of the referencing object (e.g., an object name or other unique identifier), a parent database of the referencing object, a parent schema of the referencing object, and a domain of the referencing object.

At operation 715, the dependency management system 228 stores the dependency record in a dependency record database used to track object dependencies within the database system 102. That is, the dependency record database includes dependency records for each object dependency detected by the dependency management system 228. Consistent with some embodiments, the dependency management system 228 can store the dependency record in an intermediate database prior to moving the record to the dependency record database. Consistent with these embodiments, the dependency management system 228 can move export records in bulk from the intermediate database to the dependency record database at routine intervals.

Each object dependency may be in one of two states: valid or broken. Accordingly, each dependency record in the dependency record database can further include a status indicator of either valid or broken. When a dependency record is initially created based on a detected dependency, the dependency is valid and therefore the dependency record includes an indicator of the valid status of the dependency. However, certain operations on the referencing or referenced object can change the dependency and cause it to become broken (i.e., invalid). For example, object "z" can be renamed to "z2", invalidating any by-Name dependencies on "z". Furthermore, a new object "z" can be created, establishing new dependency relationships for any objects with a by-Name dependency on name "z". Additionally, an object named "z" can be replaced with another object with the same name.

Depending on the dependency type, an invalid dependency can become a valid dependency. For example, object identifiers are typically universally unique so a by-ID dependency that becomes invalid will remain invalid. However, given that that object names can be reused, a by-Name dependency that becomes invalid, for example, because an object is dropped, can once again become valid if a new object is created with the same name as the dropped object.

In some embodiments, the dependency management system 228 handles changes to by-Name dependencies by maintaining two dependency data structures (e.g., two dependency record databases). For example, the dependency management system 228 can maintain a first dependency data structure that includes a mapping between a referencing object and referencing names and a second dependency data structure that includes a mapping between referenced object names and referenced objects. Hence, in some embodiments, the dependency management system 228 can generate two dependency records at operation 710 for a by-Name dependency. The first dependency record can include a mapping between the referencing object and the referencing name, and the second dependency record can include the mapping between an object name and the referenced object. At query time, the dependency management system 228 performs a lookup in both data structures to obtain dependency information for a given object. In contrast to by-Name dependencies, direct dependencies can be handled using a data structure that includes a mapping directly between referencing and referenced objects.

Consistent with some embodiments, the method 700 can further include operations 720, 725, 730, 735, and 740 to address changes to object dependencies. Consistent with these embodiments, the operations 720, 725, 730, 735, and 740 can be performed subsequent to operation 715 where the dependency management system 228 stores the dependency record in the dependency record database.

At operation 720, the dependency management system 228 detects a modification to an object that changes the object dependency. The object may be the referencing object, the referenced object, or a third object. The dependency management system 228 detects the modification based on a command to perform an operation that changes the object. The database system 102 may detect the modification at query time based on an incoming command or by accessing the log of operations. As an example, the command may correspond to an operation to: create an object; replace an object; drop an object; drop a schema; drop a database; drop a column from a table; add a column to a table; rename an object; rename a schema; rename a table; swap a first object with a second object; swap a first schema with a second object; alter a policy; undrop an object; undrop a schema; undrop a database; clone an object; clone a schema; clone a database; change usage permission on an object; or change usage permission on a schema.

In an example of a change to a third object that changes the object dependency, a view A invokes a user defined function (UDF) B with an argument C (e.g., B(C·x)), which is a table containing a column X of a type string. In this example, "B" is the name assigned to two overloaded UDFs, one of which takes a string argument, and the other takes an integer argument. If C is replaced with a table containing a column "X" of type integer, then the UDF object that A depends on will change.

At operation 725, the dependency management system 228 determines whether the modification results in the dependency being broken. For example, a view V can initially be created over a table T1, thereby creating a dependency of V on T1. Later, T1 can be replaced with T2, thereby breaking the object dependency between V and TI and creating a new object dependency between V and T2.

If the modification results in the dependency being broken, the dependency management system 228 invalidates the dependency record, at operation 730. That is, the dependency management system 228 changes the status indicator for the dependency record to reflect the broken status of the dependency.

In some instances, the change to the referenced or referencing object can result in multiple dependency records being broken. In an example, a command to drop an object A can result in each of multiple object dependencies that reference object A being broken. In these instances, the dependency management system 228 invalidates each dependency record that references object A. That is, in some instances, the dependency management system 228 may invalidate multiple records if the change to the referencing object or referenced object results in multiple object dependencies being broken.

At operation 735, the dependency management system 228 creates a new dependency record in the database based on the change to the object dependency. The new dependency record reflects a new object dependency created as a result of the change to the referencing or referenced object. Following the example of the view V introduced above, when T1 is replaced by T2, a new object dependency is created between V and T2 and the dependency management system 228 generates a new dependency record to reflect the new object dependency. The new dependency record can be added to the database or used to replace an existing record in the database. The new dependency record is created with a valid status.

As noted above, in some instances, an invalid dependency can become a valid dependency. Accordingly, at operation 740, the dependency management system 228 revalidates one or more existing dependency records. In revalidating a dependency record, the dependency management system 228 can change a status of the dependency record from broken to valid based on whether the change to the referencing or referenced object causes an object dependency to become valid. Following the example above, an existing invalid object dependency from an object B that references T2 can become valid in response to a command to replace T1 with T2 and the dependency management system 228 can revalidate the underlying dependency record for object B to indicate the valid status of the object dependency.

Figure 9:
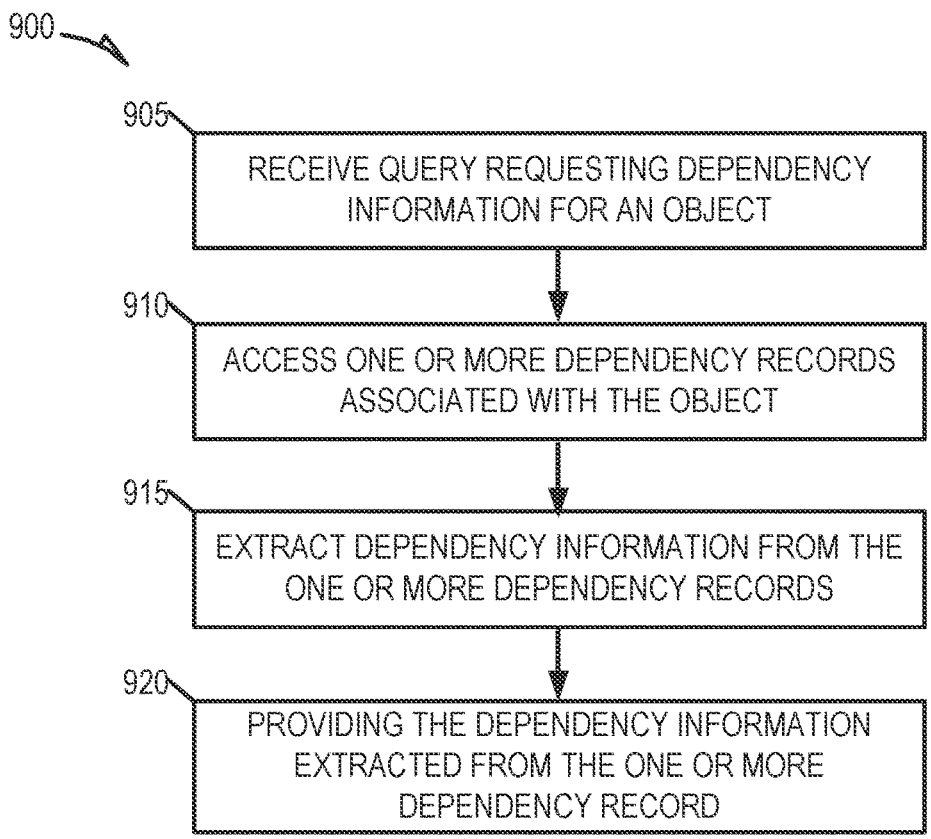
FIG. 9 is a flow diagram illustrating operations of the database system in performing a method for responding to a query for dependency information about an object, in accordance with some embodiments of the present disclosure.

FIG. 9 is a flow diagram illustrating operations of the database system 102 in performing a method 900 for responding to a query for dependency information for an object, in accordance with some embodiments of the present disclosure. The method 900 may be embodied in computer-readable instructions for execution by one or more hardware components (e.g., one or more processors) such that the operations of the method 900 may be performed by components of database system 102. Accordingly, the method 900 is described below, by way of example with reference thereto. However, it shall be appreciated that the method 900 may be deployed on various other hardware configurations and is not intended to be limited to deployment within the database system 102.

Depending on the embodiment, an operation of the method 900 may be repeated in different ways or involve intervening operations not shown. Though the operations of the method 900 may be depicted and described in a certain order, the order in which the operations are performed may vary among embodiments, including performing certain operations in parallel or performing sets of operations in separate processes. In addition, in accordance with some embodiments, any one or more of the operations of the method 900 can be performed as part of the method 700 subsequent to the operation 715 where the dependency management system 228 stores the dependency record in the dependency record database.

At operation 905, the database system 102 receives a query requesting dependency information for an object. The query may include a request for other objects on which the object depends, other objects that depend on the object, or a combination of both.

At operation 910, the dependency management system 228 accesses one or more dependency records in the object dependency database that are associated with the object. The dependency records may include records in which the object is identified as a referencing object, records in which the object is identified as a referenced object, or a combination of both. As noted above, in some embodiments, the dependency management system 228 may maintain two separate dependency data structures to track by-Name dependencies. Consistent with these embodiments, the dependency management system 228 can, as part of performing operation 910, perform a look-up in both data structures to identify the one or more dependency records that are associated with the object.

The dependency management system 228 extracts the dependency information from the dependency records, at operation 915, and the database system 102 provides the dependency information about the object in response to the query, at operation 920. Depending on the query, the dependency information can identify other objects that depend on the object, other objects on which the object depends, or a combination of both. In some embodiments, providing the dependency information includes causes presentation of the dependency information on a computing device from which the query is received.

FIG. 10 is a conceptual diagram illustrating aspects of the dependency management system 228 in tracking object dependencies and responding to queries for dependency information, in accordance with an example. In this example, an object 1005 ("DailyTotFeedByUser") has a dependency on an object 1010 ("SocialMediaFeed"), which has a dependency on objects 1015 ("FacebookFeedT") and 1020 ("TwitterFeedT"). In addition, an object 1025 ("TwitterFeedDaily") has a dependency on the object 1020. As shown, the object 1005 is a table function with a dependency on the object 1010, which is a view on a first table (object 1015) and a second table (object 1020). The object 1025 is a view on the second table (object 1020).

The dependency management system 228 detects the above referenced object dependencies based on DDL operations. The dependency management system 228 can detect the DDL operations at query time based on statements in a query or by accessing a log of DDL operations. As a more specific example, the dependency management system 228 can detect the object dependencies based on the following SQL statements:

```
CREATE VIEW TwitterFeedDaily as SELECT
FROM TwitterFeedT WHERE posted_on >=
>=DATEADD('days' ,-1,CURRENT_DATEO};
CREATE VIEW SocialMediaFeed as SELECT *
FROM TwitterFeedT UNION SELECT * FROM FacebookFeedT;
CREATE TABLE FUNCTION
DailyTotFeedByUser(user_name string)
RETRUNS (total number)
AS
$$
SELECT COUNT(*) FROM SocialMediaFeed
WHERE username=name and posted_on >=
>=DATEADD('days' ,-1,CURRENT _DATEO);
$$
```

The dependency management system 228 generates a dependency record for each object dependency shown in FIG. 10. A view of the dependency records generated for the objects 1005, 1010, 1015, 1020, and 1025 is shown in table 1030.

In furthering this example, a data engineer may want to track down all the direct and transitively dependent objects that can be affected if the object 1025 ("TwitterFeedT") is dropped or altered. To do so, the data engineer can run the following query:

```
WITH impact_analysis AS
(
  SELECT
    Sys_connect_by_path( '-> ', referencing_object_name) name_path,
    Sys_connect_by_path( '-> ', referencing_object_domain)
    domain_path,
    referenced_object_name,
    referenced_object_domain
  FROM
    object_dependencies CONNECT by referenced_object_name = prior
    referencing_object_name
)
SELECT
  referencing_object_domain name_p || '->' || name_path,
  referencing_object_domain domain_p || '->' || domain_path
FROM
  impact_analysis
WHERE
  referenced_object_name = 'TwitterFeedT'
  AND referenced_object_domain = 'TABLE';
```

Responsive to this query, the dependency management system 228 accesses one or more dependency records associated with the object 1025, extracts requested dependency information from the records, and provides the requested dependency information. Table 1035 shows an example of the output of the query where each row shows a path of referencing objects that will be affected by the change.

Described implementations of the subject matter can include one or more features, alone or in combination as illustrated below by way of example.

Example 1 is a database system comprising: at least one hardware processor; and at least one memory storing instructions that cause the at least one hardware processor to perform operations comprising: detecting an object dependency created between a referencing object and a referenced object; based on detecting the object dependency, generating a dependency record including dependency information describing the object dependency between the referencing object and the referenced object; and storing the dependency record in a database of dependency records.

Example 2 includes the system of Example 1, wherein the operations further comprise: detecting a change to the object dependency; determining the change causes the object dependency to be broken; and invalidating the dependency record in response to determining the change causes the object dependency to be broken.

Example 3 includes the system of any one or more of Examples 1 or 2, wherein the operations further comprise: detecting a change to the object dependency; generating a second dependency record based on the change; and storing the second dependency record in the database.

Example 4 includes the system of any one or more of Examples 1-3, wherein: the referenced object is a first referenced object; the object dependency is a first object dependency; and the change results in a second object dependency between the referencing object and a second referenced object.

Example 5 includes the system of any one or more of Examples 1-4, wherein the storing of the second dependency record comprises replacing an existing dependency record in the database.

Example 6 includes the system of any one or more of Examples 1-5, wherein the dependency record includes one or more of: a first identifier corresponding to the referenced object, a parent database of the referenced object, a parent schema of the referenced object, a domain of the referenced object, a second identifier corresponding to the referencing object, a parent database of the referencing object, a parent schema of the referencing object, and a domain of the referencing object.

Example 7 includes the system of any one or more of Examples 1-6, wherein the detecting of the object dependency is based on an operation that creates the referencing object.

Example 8 includes the system of any one or more of Examples 1-7, wherein the detecting of the object dependency includes accessing a log of operations on the referencing object, the log of operations including the operation that creates the referencing object.

Example 9 includes the system of any one or more of Examples 1-8, further comprising: receiving a query requesting the dependency information associated with the referencing object; in response to the query, accessing the dependency record from the database of dependency records; extracting the dependency information from the dependency record; and providing the dependency information responsive to the query.

Example 10 includes the system of any one or more of Examples 1-9, wherein the providing of the dependency information includes causing display of the dependency information at a client device in communication with the database system, wherein the query is received from the client device.

Example 11 is a method comprising: detecting, within a database system, an object dependency created between a referencing object and a referenced object; based on detecting the object dependency, generating, by one or more hardware processors, a dependency record including dependency information describing the object dependency between the referencing object and the referenced object; and storing the dependency record in a database of dependency records.

Example 12 includes the method of Example 11, and further includes: detecting a change to the object dependency; determining the change causes the object dependency to be broken; and invalidating the dependency record in response to determining the change causes the object dependency to be broken.

Example 13 includes the method of any one or more of Examples 11 or 12 and further includes detecting a change to the object dependency; generating a second dependency record based on the change; and storing the second dependency record in the database.

Example 14 includes the method of any one or more of Examples 11-13, wherein: the referenced object is a first referenced object; the object dependency is a first object dependency; and the change results in a second object dependency between the referencing object and a second referenced object.

Example 15 includes the method of any one or more of Examples 11-14, wherein the storing of the second dependency record comprises replacing an existing dependency record in the database.

Example 16 includes the method of any one or more of Examples 11-15, wherein the dependency record includes one or more of: a first identifier corresponding to the referenced object, a parent database of the referenced object, a parent schema of the referenced object, a domain of the referenced object, a second identifier corresponding to the referencing object, a parent database of the referencing object, a parent schema of the referencing object, and a domain of the referencing object.

Example 17 includes the method of any one or more of Examples 11-16, wherein the detecting of the object dependency is based on an operation that creates the referencing object.

Example 18 includes the method of any one or more of Examples 11-17, wherein the detecting of the object dependency includes accessing a log of operations on the referencing object, the log of operations including the operation that creates the referencing object.

Example 19 includes the method of any one or more of Examples 11-18, and further comprises: receiving a query requesting the dependency information associated with the referencing object; in response to the query, accessing the dependency record from the database of dependency records; extracting the dependency information from the dependency record; and providing the dependency information responsive to the query.

Example 20 includes the method of any one or more of Examples 11-19, wherein the providing of the dependency information includes causing display of the dependency information at a client device in communication with the database system, wherein the query is received from the client device.

Example 21 is a computer-storage medium storing instructions that cause at least one hardware processor to perform operations comprising: detecting, within a database system, an object dependency created between a referencing object and a referenced object; based on detecting the object dependency, generating a dependency record including dependency information describing the object dependency between the referencing object and the referenced object; and storing the dependency record in a database of dependency records.

Example 22 includes the computer-storage medium of Example 21, wherein the operations further comprise: detecting a change to the object dependency; determining the change causes the object dependency to be broken; and invalidating the dependency record in response to determining the change causes the object dependency to be broken.

Example 23 includes the computer-storage medium of any one or more of Examples 21 or 22, wherein the operations further comprise: detecting a change to the object dependency; generating a second dependency record based on the change; and storing the second dependency record in the database.

Example 24 includes the computer-storage medium of any one or more of Examples 21-23, wherein: the referenced object is a first referenced object; the object dependency is a first object dependency; and the change results in a second object dependency between the referencing object and a second referenced object.

Example 25 includes the computer-storage medium of any one or more of Examples 21-24, wherein the storing of the second dependency record comprises replacing an existing dependency record in the database.

Example 26 includes the computer-storage medium of any one or more of Examples 21-25, wherein the dependency record includes one or more of: a first identifier corresponding to the referenced object, a parent database of the referenced object, a parent schema of the referenced object, a domain of the referenced object, a second identifier corresponding to the referencing object, a parent database of the referencing object, a parent schema of the referencing object, and a domain of the referencing object.

Example 27 includes the computer-storage medium of any one or more of Examples 21-26, wherein the detecting of the object dependency is based on an operation that creates the referencing object.

Example 28 includes the computer-storage medium of any one or more of Examples 21-27, wherein the detecting of the object dependency includes accessing a log of operations on the referencing object, the log of operations including the operation that creates the referencing object.

Example 29 includes the computer-storage medium of any one or more of Examples 21-28, further comprising: receiving a query requesting the dependency information associated with the referencing object; in response to the query, accessing the dependency record from the database of dependency records; extracting the dependency information from the dependency record; and providing the dependency information responsive to the query.

Example 30 includes the computer-storage medium of any one or more of Examples 21-29, wherein the providing of the dependency information includes causing display of the dependency information at a client device in communication with the database system, wherein the query is received from the client device.

Figure 11:
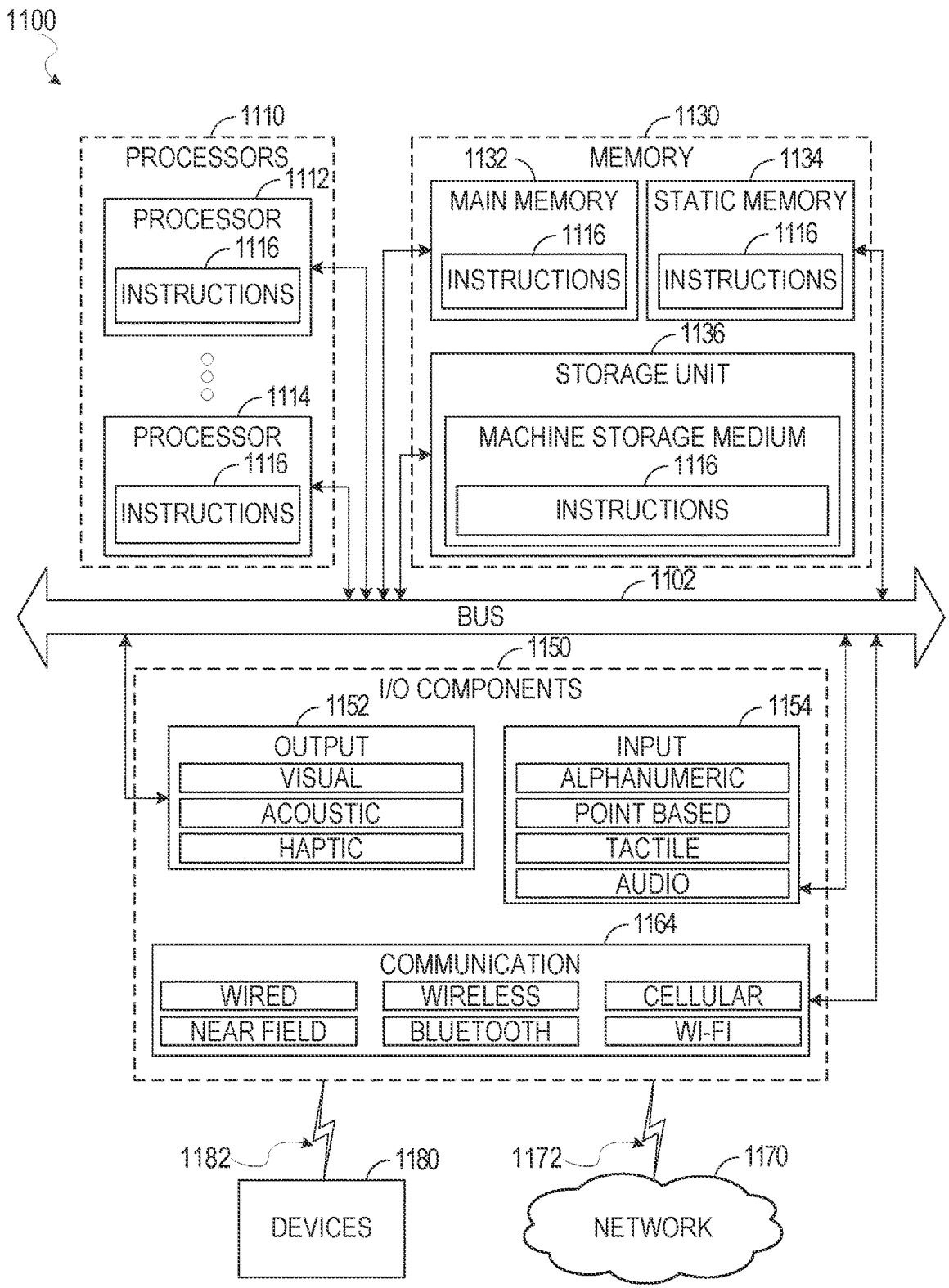
FIG. 11 illustrates a diagrammatic representation of a machine in the form of a computer system within which a set of instructions may be executed for causing the machine to perform any one or more of the methodologies discussed herein, in accordance with some embodiments of the present disclosure.

FIG. 11 illustrates a diagrammatic representation of a machine 1100 in the form of a computer system within which a set of instructions may be executed for causing the machine 1100 to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute any one or more operations of the methods 700 or 900. As another example, the instructions 1116 may cause the machine 1100 to implement portions of the functionality illustrated in any one or more of FIGS. 4-6. In this way, the instructions 1116 transform a general, non-programmed machine into a particular machine 1100 (e.g., the compute service manager 108, the execution platform 110, and the computing device 112) that is specially configured to carry out any one of the described and illustrated functions in the manner described herein.

In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 includes processors 1110, memory 1130, and input/output (I/O) components 1150 configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors 1110 that may comprise two or more independent processors (sometimes referred to as "cores") that may execute instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiple cores, or any combination thereof.

The memory 1130 may include a main memory 1132, a static memory 1134, and a storage unit 1136, all accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 include components to receive input, provide output, produce output, transmit information, exchange information, capture measurements, and so on. The specific I/O components 1150 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1150 may include communication components 1164 operable to couple the machine 1100 to a network 1170 or devices 1180 via a coupling 1172 and a coupling 1182, respectively. For example, the communication components 1164 may include a network interface component or another suitable device to interface with the network 1170. In further examples, the communication components 1164 may include wired communication components, wireless communication components, cellular communication components, and other communication components to provide communication via other modalities. The devices 1180 may be another machine or any of a wide variety of peripheral devices (e.g., a peripheral device coupled via a universal serial bus (USB)). For example, as noted above, the machine 1100 may correspond to any one of the compute service manager 108, the execution platform 110, and the devices 1180 may include the data storage device 206 or any other computing device described herein as being in communication with the database system 102 or the storage platform 104.

Executable Instructions and Machine Storage Medium

The various memories (e.g., 1130, 1132, 1134, and/or memory of the processor(s) 1110 and/or the storage unit 1136) may store one or more sets of instructions 1116 and data structures (e.g., software) embodying or utilized by any one or more of the methodologies or functions described herein. These instructions 1116, when executed by the processor(s) 1110, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1170 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1170 or a portion of the network 1170 may include a wireless or cellular network, and the coupling 1172 may be a Code Division Multiple Access (CDMA) connection, a Global System for Mobile communications (GSM) connection, or another type of cellular or wireless coupling. In this example, the coupling 1172 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1116 may be transmitted or received over the network 1170 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1182 (e.g., a peer-to-peer coupling) to the devices 1180. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods 700 and 900 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A database system comprising:
    at least one hardware processor; and
    at least one memory storing instructions that cause the at least one hardware processor to perform operations comprising:
    detecting a first object dependency created between a referencing object and a referenced object within a database system based on a data definition language (DDL) command received by the database system;
    based on detecting the first object dependency, generating a first dependency record including first dependency information describing the first object dependency between the referencing object and the referenced object;
    detecting a change to the first object dependency;
    based on the change to the first object dependency, generating a second dependency record including second dependency information describing a second object dependency associated with the referencing object or the referenced object; and
    in response to determining that the change results in the first object being broken, invalidating the first dependency record, the invalidating of the first dependency record comprising updating a validity status in the first dependency record to indicate the first object dependency is broken.

2. The database system of claim 1, wherein the operations further comprise providing the first dependency information for display at a client device in communication with the database system.

3. The database system of claim 2, wherein the operations further comprise receiving, from the client device, a query requesting dependency information related to the referencing object, wherein the first dependency information is provided for display in response to the query.

4. The database system of claim 1, wherein:
    the referenced object is a first referenced object; and
    the change results in the second object dependency between the referencing object and a second referenced object.

5. The database system of claim 4, wherein the operations further comprise replacing an existing dependency record in a database of dependency records with the second dependency record.

6. The database system of claim 1, wherein the first dependency record includes one or more of: a first identifier corresponding to the referenced object, a parent database of the referenced object, a parent schema of the referenced object, a domain of the referenced object, a second identifier corresponding to the referencing object, a parent database of the referencing object, a parent schema of the referencing object, and a domain of the referencing object.

7. The database system of claim 1, wherein the detecting of the first object dependency includes accessing a log of DDL operations on the referencing object, the log of DDL operations including the DDL command that created the referencing object.

8. The database system of claim 1, wherein the detecting of the first object dependency comprises detecting, at query time, the DDL command in a statement of a query received by the database system.

9. The database system of claim 1, wherein the change to the first object dependency comprises a new object being created.

10. The database system of claim 1, wherein the operations further comprise updating the validity status of the first dependency record based on an additional change to the first object dependency that causes the first object dependency to become valid.

11. A method comprising:
- detecting a first object dependency created between a referencing object and a referenced object within a database system based on a data definition language (DDL) command received by the database system;
- based on detecting the first object dependency, generating, by one or more hardware processors, a first dependency record including first dependency information describing the first object dependency between the referencing object and the referenced object;
- detecting a change to the first object dependency;
- based on the change to the first object dependency, generating a second dependency record including second dependency information describing a second object dependency associated with the referencing object or the referenced object; and
- in response to determining that the change results in the first object being broken, invalidating the first dependency record, the invalidating of the first dependency record comprising updating a validity status in the first dependency record to indicate the first object dependency is broken.

12. The method of claim 11, further comprising providing the first dependency information for display at a client device in communication with the database system.

13. The method of claim 12, further comprising receiving, from the client device, a query requesting dependency information related to the referencing object, wherein the first dependency information is provided for display in response to the query.

14. The method of claim 11, wherein:
- the referenced object is a first referenced object; and
- the change results in the second object dependency between the referencing object and a second referenced object.

15. The method of claim 14, further comprising replacing an existing dependency record in a database of dependency records with the second dependency record.

16. The method of claim 11, wherein the first dependency record includes one or more of: a first identifier corresponding to the referenced object, a parent database of the referenced object, a parent schema of the referenced object, a domain of the referenced object, a second identifier corresponding to the referencing object, a parent database of the referencing object, a parent schema of the referencing object, and a domain of the referencing object.

17. The method of claim 11, wherein the detecting of the first object dependency includes accessing a log of DDL operations on the referencing object, the log of DDL operations including the DDL command that created the referencing object.

18. The method of claim 11, wherein the detecting of the first object dependency comprises detecting, at query time, the DDL command in a statement of a query received by the database system.

19. The method of claim 11, wherein the change to the first object dependency comprises a new object being created.

20. A computer-storage medium storing instructions that cause at least one hardware processor to perform operations comprising:
- detecting a first object dependency created between a referencing object and a referenced object within a database system based on a data definition language (DDL) command received by the database system;
- based on detecting the first object dependency, generating, by one or more hardware processors, a first dependency record including first dependency information describing the first object dependency between the referencing object and the referenced object;
- detecting a change to the first object dependency; and
- based on the change to the first object dependency, generating a second dependency record including second dependency information describing a second object dependency associated with the referencing object or the referenced object; and
- in response to determining that the change results in the first object being broken, invalidating the first dependency record, the invalidating of the first dependency record comprising updating a validity status in the first dependency record to indicate the first object dependency is broken.

* * * * *